United States Patent
Rotem et al.

(10) Patent No.: US 9,395,774 B2
(45) Date of Patent: Jul. 19, 2016

(54) TOTAL PLATFORM POWER CONTROL

(71) Applicant: Intel Corporation, Santa Clara, CA (US)

(72) Inventors: Efraim Rotem, Haifa (IL); James G. Hermerding, II, San Jose, CA (US); Ruoying Ma, Portland, OR (US); Jorge P. Rodriguez, Portland, OR (US); Nir Rosenzweig, Givat Ella (IL)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 13/730,291

(22) Filed: Dec. 28, 2012

(65) Prior Publication Data

US 2014/0189376 A1    Jul. 3, 2014

(51) Int. Cl.
| G06F 1/26 | (2006.01) |
|---|---|
| G06F 1/20 | (2006.01) |
| G06F 1/32 | (2006.01) |

(52) U.S. Cl.
CPC ...... *G06F 1/26* (2013.01); *G06F 1/206* (2013.01); *G06F 1/324* (2013.01); *G06F 1/325* (2013.01); *G06F 1/3296* (2013.01); *Y02B 60/1217* (2013.01); *Y02B 60/1275* (2013.01); *Y02B 60/1285* (2013.01)

(58) Field of Classification Search
CPC .......... G06F 1/26; G06F 1/206; G06F 1/324; G06F 1/3296; Y02B 60/1217; Y02B 60/1285
See application file for complete search history.

(56) References Cited

U.S. PATENT DOCUMENTS

| 7,574,321 | B2 | 8/2009 | Kernahan et al. |
|---|---|---|---|
| 8,185,758 | B2 * | 5/2012 | Henroid et al. ............... 713/300 |
| 8,402,290 | B2 | 3/2013 | Finkelstein et al. |
| 2002/0087904 | A1 | 7/2002 | Cai |
| 2005/0258940 | A1 * | 11/2005 | Quan .................. G06K 7/0008 340/10.3 |
| 2006/0218423 | A1 | 9/2006 | Diefenbaugh et al. |
| 2006/0294400 | A1 | 12/2006 | Diefenbaugh et al. |
| 2007/0156370 | A1 | 7/2007 | White et al. |
| 2008/0307240 | A1 | 12/2008 | Dahan et al. |
| 2010/0030392 | A1 | 2/2010 | Ferentz et al. |
| 2010/0064162 | A1 | 3/2010 | Rotem et al. |

(Continued)

FOREIGN PATENT DOCUMENTS

| CN | 104798005 A | 7/2015 |
|---|---|---|
| JP | 2002-222031 A | 9/2002 |

(Continued)

OTHER PUBLICATIONS

International Search Report and Written Opinion received for PCT Application No. PCT/US2013/046541, mailed on Nov. 6, 2013, 10 pages.

(Continued)

*Primary Examiner* — M Elamin
(74) *Attorney, Agent, or Firm* — Alpine Technology Law Group LLC

(57) ABSTRACT

Methods and apparatus relating to total platform power control are described. In one embodiment, power consumption by one or more processor cores of a processor and one or more components coupled to the processor are modified based on a total platform power consumption value. The platform, in turn, includes the processor and the one or more components. Other embodiments are also disclosed and claimed.

32 Claims, 6 Drawing Sheets

(56) References Cited

U.S. PATENT DOCUMENTS

| | | | |
|---|---|---|---|
| 2010/0115293 A1 | 5/2010 | Rotem et al. | |
| 2010/0115304 A1 | 5/2010 | Finkelstein et al. | |
| 2010/0296238 A1* | 11/2010 | Mowry et al. | 361/679.53 |
| 2011/0022857 A1 | 1/2011 | Nussbaum et al. | |
| 2011/0191607 A1 | 8/2011 | Gunther et al. | |
| 2011/0264938 A1* | 10/2011 | Henroid et al. | 713/323 |
| 2011/0301889 A1 | 12/2011 | Naffziger et al. | |
| 2012/0023345 A1* | 1/2012 | Naffziger et al. | 713/320 |
| 2012/0166839 A1 | 6/2012 | Sodhi et al. | |
| 2012/0185706 A1 | 7/2012 | Sistla et al. | |
| 2013/0159755 A1 | 6/2013 | Presant et al. | |
| 2013/0173946 A1 | 7/2013 | Rotem et al. | |

FOREIGN PATENT DOCUMENTS

| | | |
|---|---|---|
| JP | 2009-522688 A | 6/2009 |
| KR | 10-2008-0097419 A | 11/2008 |
| WO | 2007/081466 A2 | 7/2007 |
| WO | 2012/012256 A1 | 1/2012 |
| WO | 2014/105140 A1 | 7/2014 |

OTHER PUBLICATIONS

Office Action received for U.S. Appl. No. 13/340,433 mailed on Dec. 19, 2014.
Office Action and Search Report received for Tawinese Patent Application No. 102145852, mailed on Apr. 13, 2015, 12 pages including 5 pages of English translation.
Notice of Allowance received for Taiwanese Patent Application No. 102145852 mailed on Aug. 28, 2015, 2 pages of notice of allowance and 7 pages of allowed claims in English.
Non-Final Office Action received for Koream Patent Application No. 10-2015-7012618, mailed on Feb. 18, 2016, 6 pages.
Office Action received for Japanese Patent Application No. 2015-544059, mailed on May 17, 2016, 9 pages including 4 pages of English translation.

* cited by examiner

TOTAL PLATFORM POWER CONTROL

FIELD

The present disclosure generally relates to the field of electronics. More particularly, an embodiment of the invention relates to total platform power control.

BACKGROUND

As integrated circuit (IC) fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may damage an IC chip by, for example, thermal expansion. Also, the additional heat may limit usage locations and/or usage applications of a computing device that includes such chips.

For example, a portable computing device may solely rely on battery power for its operations. Hence, as additional functionality is integrated into portable computing devices, the need to reduce power consumption becomes increasingly important, for example, to maintain battery power for an extended period of time. Non-portable computing systems also face cooling and power consumption issues as their IC components use more power and generate more heat.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

One of the major limitations to computational performance in general and turbo performance in particular is the power delivery network. There are different hierarchies of power delivery network that might limit the total power consumption. Currently the problem may be solved by controlling the CPU (Central Processing Unit) power only and assigning fixed budget to the rest of the platform with guard band. This results in non optimal settings or risk of shut down if guard band is not sufficient. Furthermore, some implementations may control the CPU power consumption at different time intervals and the power reading may be done by various methods, one of which can be reading power consumption reported by the CPU Voltage Regulator (VR). Hence, such implementations do not fully address platform level power control.

By contrast, some embodiments discussed herein target the total platform power consumption based on various information, e.g., including one or more inputs/readings obtained from the platform components, control value (or parameter) setting, and control policy. This approach may be supplemented, e.g., by using remote sensing of platform power. For example, an (e.g., electrical current) sensor on the platform samples current consumption and feeds this information to the CPU VR from which it is being sampled and controlled.

In an embodiment, allowing for control of the total platform power consumption, permits usage of a smaller power supply unit(s), less design guard band, and/or a more robust system with reduced risk for system shut down. This may be especially important for small form factors such as tablets, phones, and ultrabooks on one hand and servers on the other extreme. Additionally, such techniques may allow for cost reduction of desktop power supply units.

Figure 1:
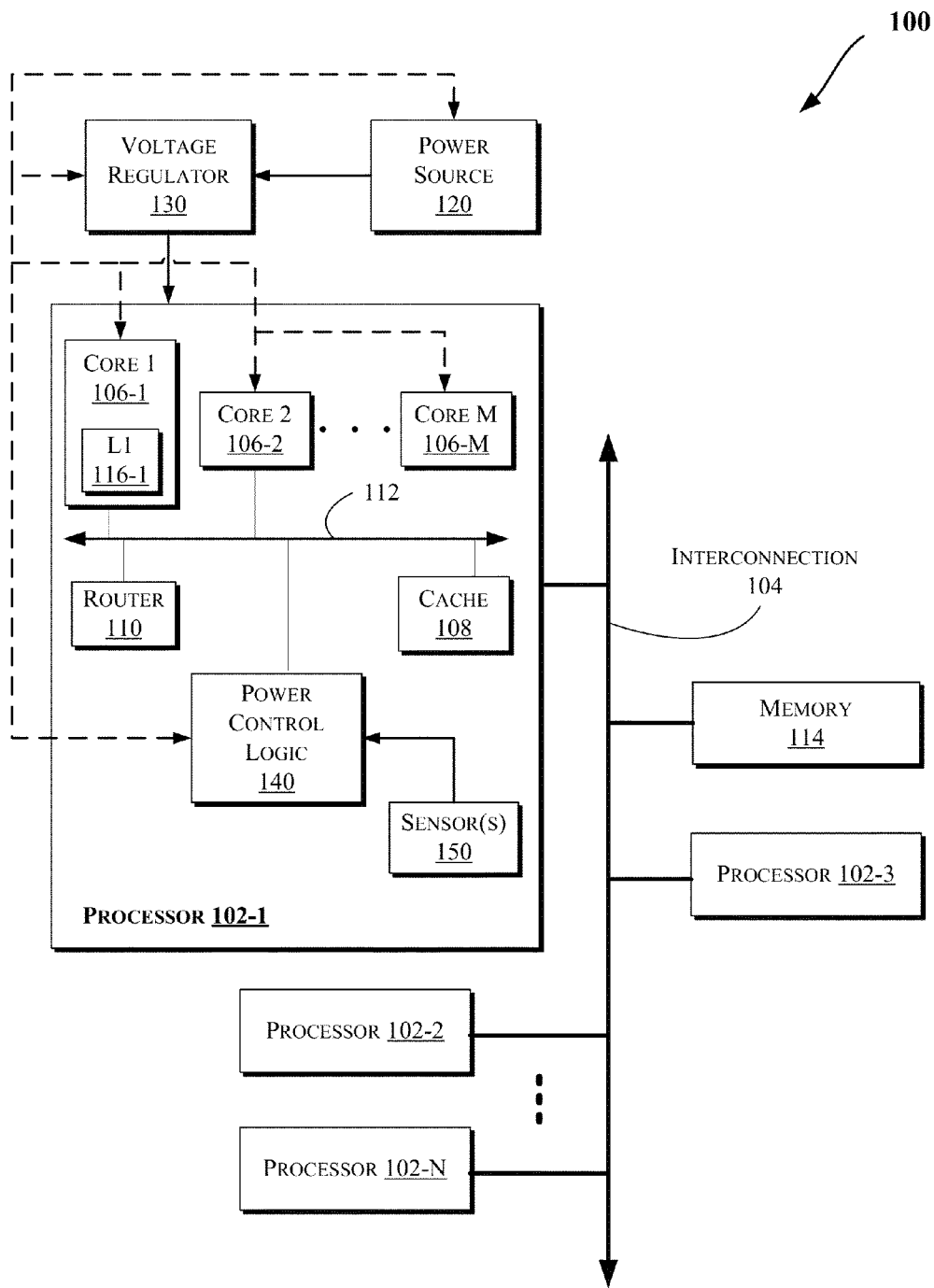
FIGS. 1 and 4-6 illustrate block diagrams of embodiments of computing systems, which may be utilized to implement various embodiments discussed herein.

Moreover, some embodiments may be applied in computing systems that include one or more processors (e.g., with one or more processor cores), such as those discussed with reference to FIGS. 1-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 4-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a platform power source 120 (e.g., a direct current (DC) power source or an alternating current (AC) power source) to provide power to one or more components of the system 100. In an embodiment, the platform power source 120 may be a PSU such as discussed herein. In some embodiments, the power source 120 may include one or more battery packs and/or power supplies. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, the processor 102 may further include a power control logic 140 to control supply of power to components of the processor 102 (e.g., cores 106). Logic 140 may have access to one or more storage devices discussed herein (such as cache 108, L1 cache 116, memory 114, or another memory in system 100) to store information relating to operations of logic 140 such as information communicated with various components of system 100 as discussed here. As shown, the logic 140 may be coupled to the VR 130 and/or other components of system 100 such as the cores 106 and/or the power source 120.

For example, the logic 140 may be coupled to receive information (e.g., in the form of one or more bits or signals) to indicate status of one or more sensors 150. The sensor(s) 150 may be provided proximate to component(s) of system 100 (or other computing systems discussed herein such as those discussed with reference to other figures including 4 and 5, for example), such as the cores 106, interconnections 104 or 112, components outside of the processor 102, etc., to sense variations in various factors affecting power/thermal behavior of the system/platform, such as temperature, operating frequency, operating current, operating voltage, power consumption, and/or inter-core communication activity, etc.

The logic 140 may in turn instruct the VR 130, power source 120, and/or individual components of system 100 (such as the cores 106) to modify their operations. For example, logic 140 may indicate to the VR 130 and/or power source 120 (or PSU) to adjust their output. In some embodiments, logic 140 may request the cores 106 to modify their operating frequency, operating current, power consumption, etc. Also, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, etc. Furthermore, as shown in FIG. 1, the power source 120 and/or the voltage regulator 130 may communicate with the power control logic 140 and report their power specification.

Figure 2:
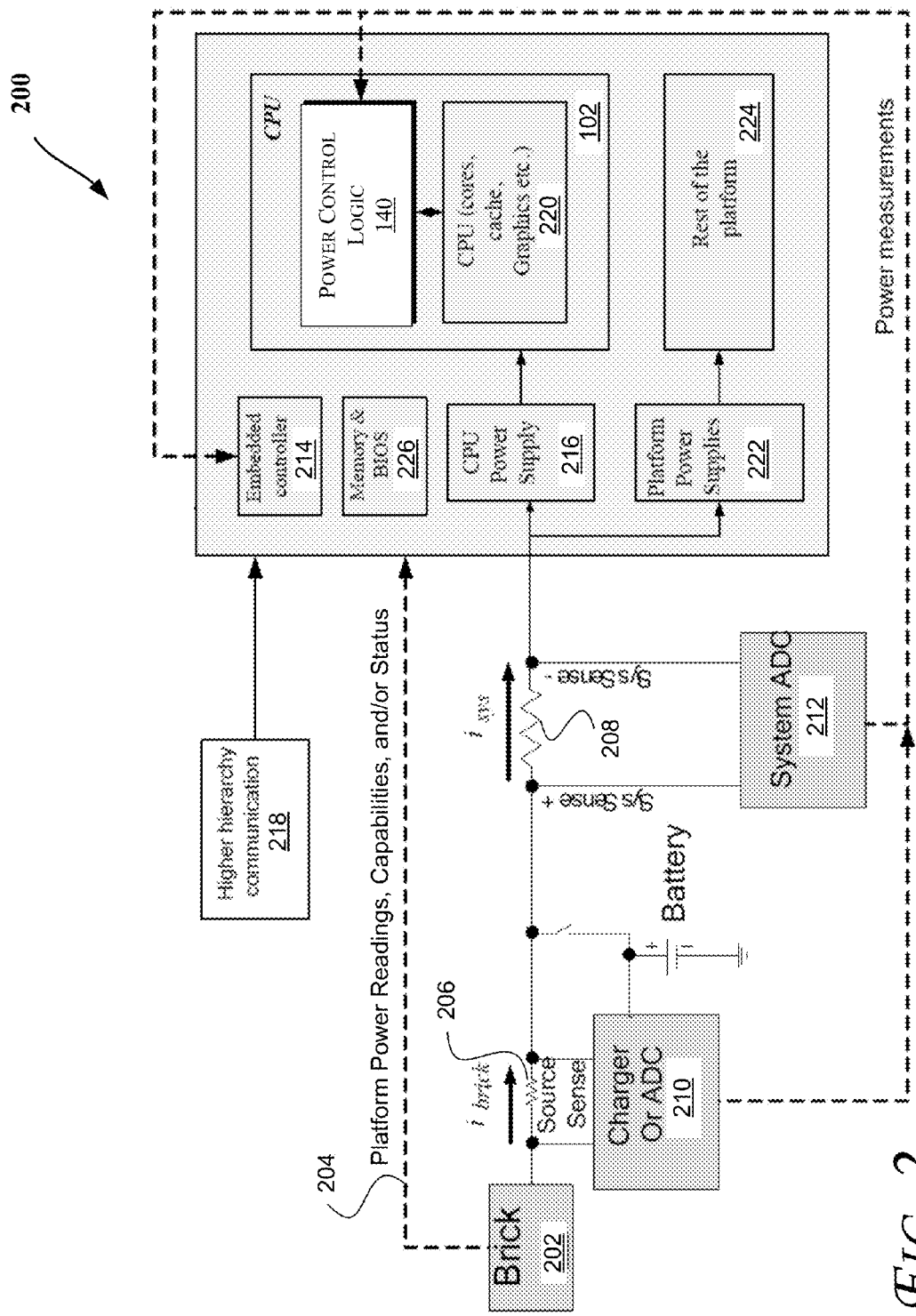
FIG. 2 illustrates a block diagram of computing system components, according to some embodiments.

FIG. 2 illustrates a block diagram of a power management system 200, according to an embodiment. Power readings (e.g., power consumption value (e.g., delivered), capabilities, and/or status) are provided (e.g., digitally) from an intelligent brick 202 via a communication link 204 or sense resistors in series to the brick and/or in series to the total system (brick and battery), resistors 206 and 208, respectively. A brick generally refers to a power supply (such as power supply 120 of FIG. 1) that is capable of converting AC (Alternating Current) to DC (Direct Current) that is to be used by a computer. Furthermore, an intelligent brick generally refers to a power supply that is capable of performing other functions (such as those discussed herein) in addition to just power conversion.

As shown in FIG. 2, ADCs (Analog to Digital Converters) 210 and 212 sample the voltage on the resistors 206 and 208, respectively. ADC can be dedicated (such as ADCs 212), integrated into an embedded controlled 214, integrated into VR (such as the VR 130 of FIG. 1, within a CPU Power Supply 216), and/or integrated into chip 210. Control is done by the power control logic 140 (also referred to herein as PMU (Power Management Unit) or PCU (Power Control Unit)), the embedded controller 214, and/or a node manager 218 (which may allow for higher hierarchy communication in an embodiment). The power control is performed by a power control unit.

Referring to FIG. 2, system 200 divides the contents of the CPU/processor 102 into control logic 140 and the remaining portions of the processor 220 for simplicity. A platform power supply/supplies 222 are also included (e.g., to supply power to the rest of the platform 224 (i.e., other than one or more processors 102, for example)). System 200 may also include a memory and/or BIOS 226 as discussed herein. As shown in FIG. 2, power measurements (e.g., from items 210 and 212) may also be provided to the logic 140 and/or embedded controller 214 in some embodiments.

Accordingly, in some embodiments, one or more of the following may be used: platform power sensing, communication of the sensed information to the CPU, and/or dynamic setting of power control related parameter(s). For example, platform electrical current sensing (e.g., via one or more sensors such as sensor(s) 150 of FIG. 1) on board component(s) of the platform such as in a PSU (Power Supply Unit, e.g., the power source 120 of FIG. 1, and/or one or more of supplies 216 and 222) communicates to the CPU complex (e.g., processor 102, chipset (such as chipsets 406 of FIG. 4 and/or 520 of FIG. 5 (or portions thereof such as PCH (Platform Control Hub)), memory controller (such as items 410 of FIG. 4 and/or 506, 508 of FIG. 5), GFX (Graphics logic, including for example integrated graphics (e.g., on a same IC as a processor), items 414 and 416 of FIG. 4, and/or 534 of FIG. 5), and/or memory (such as memory 114 of FIG. 1)), which tend to be the biggest power consumers, may be used to control the power consumption in order to meet the total platform budget or goal. Also, such adjustments may include modification to parameter setting having an effect on the total platform budget, e.g., via changes to BIOS (Basic Input/Output System), smart PSU (e.g., where the power supply communicates its maximum capability/output to the system via some data link), power policy, etc.

Figure 3:
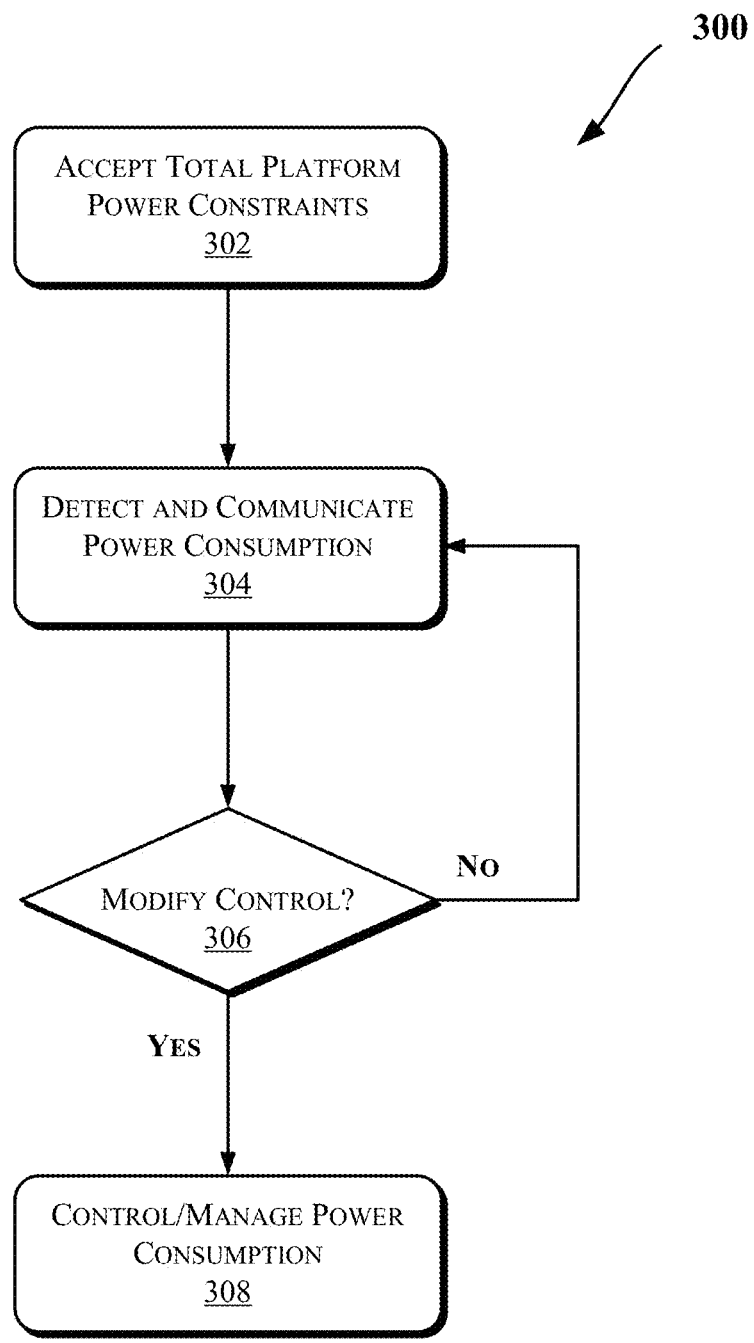
FIG. 3 illustrates a flow diagram according to some embodiments.

FIG. 3 illustrates a flow diagram of an embodiment of a method 300 to control total power consumption by a platform, according to some embodiments. In an embodiment, various components discussed with reference to FIGS. 1-2 and 4-6 may be utilized to perform one or more of the operations discussed with reference to FIG. 3 (including for example logic 140).

Referring to FIGS. 1-3, at an operation 302, the total platform power constraints are accepted (e.g., maximum power consumption for different time intervals are set/determined). The power control unit (such as those discussed with reference to FIG. 2) needs to have the power limits to control the power consumption in order to meet the limits. The limits can be set by one or more of the following in accordance with various embodiments:

1. BIOS as a fixed limit based on the specific platform implementation.

2. Communication from a smart brick (or silver box that is a power supply for a desktop computer) via some data link. For example, the brick reports its maximum current capability(s) to the power control unit.

3. Node manager and higher hierarchies. In server computer rack and data centers there is total power delivery limit from the electricity infrastructure. For example, an upper hierarchy can perform load balancing and tracking and communicate power budget to the each of the platforms in the rack or data center. In accordance with some embodiments, an embedded controller could be used to set the limits in client products.

4. Battery can be used to assist the power delivery or deliver the entire system power. Smart batteries report their charge level. The battery power status and capacity can be used also to define the power limit.

In an embodiment, these limits can be changed on the fly. For example, pulling out the AC plug and change from AC to DC, data center status, user policy, energy star and regulatory requirements, etc. may cause changes to the limits.

At an operation 304, values relating to power consumption by one or more platform components are (e.g., continuously) read/detected (e.g., by the sensor(s) 150) and communicated to power management unit. In some embodiments, control is provided by continuously reading and communicating the power consumption to power management unit (the limit can be current in A and/or power in W). There are two limits that are communicated in an embodiment:

1. Brick/silver box limit which indicates the power supply capability out of the wall outlet (e.g., in terms of current and/or wattage).

2. Total platform limit which is the combined battery and brick currents (and/or wattage) for some of the advanced mobile platforms power delivery schemes.

In some embodiments, current sensing is done by measuring voltage drop on a serial sense resistor or using a semiconductor sensor such as a Hall Effect sensor, current mirror FET (Field Effect Transistor), etc. (such as those discussed with reference to FIG. 2). Sensing power may involve current and/or voltage sensing. There are several options for sensing and communicating the above values (voltage and current) including for example one or more of:

1. Sensing the input brick power consumption via the charger logic (e.g., via battery charging control 210).

2. Sensing using existing voltage regulator (such as VRs discussed with reference to FIGS. 1-2).

3. Sensing using ADC inputs to the embedded controller 214.

4. Sensing using a dedicated ADC chip on the platform (such as logic 212 of FIG. 2).

Furthermore, reading the (e.g., digital) values can be done using one of the existing serial busses such as SVID (utilizing a communication protocol for Serial VID provided by Intel® Corporation), PECI (Platform Environment Control Interface, e.g., for thermal management), I2C (Inter-Integrated Circuit), etc. In an embodiment, the detected values are compared against one or more thresholds and just a single status bit is communicated, such as via an existing mechanism such as PROCHOT (which refers to a thermal throttle activity bit, e.g., to determine processor thermal status) or alternatively via a new dedicated status bit.

At an operation 306, it is determined (e.g., by the PCU such as those discussed with reference to FIGS. 1-2) whether control is to be adjusted, e.g., based on the detected/communication power consumption values at operation 304. If not, method 300 returns to operation 304 to maintain continuous detection/communication as discussed above. However, if modification is required, power consumption is controlled/managed at an operation 308, e.g., in order to fit into the power limitations discussed with reference to operation 302. In an embodiment, power consumption is controlled over multiple time intervals, e.g., with multiple power limits. More particularly, computer systems generally have multiple power constraints and a processor may be shipped with a rated power consumption, e.g., measured over some "thermally significant time". OEMs (Original Equipment Manufacturers) who build computing systems need to design for multiple constraints of the whole platform. These power constraints, in turn, impact the system over different time intervals. In some embodiments, a first power limit (referred to herein as PL1) is used for thermally significant time over many seconds and a second power limit (referred to herein as PL2) in 100s of microseconds to a few milliseconds is used for electrical limitations. two power limits (PL1 and PL2) used during multiple intervals.

Figure 4:
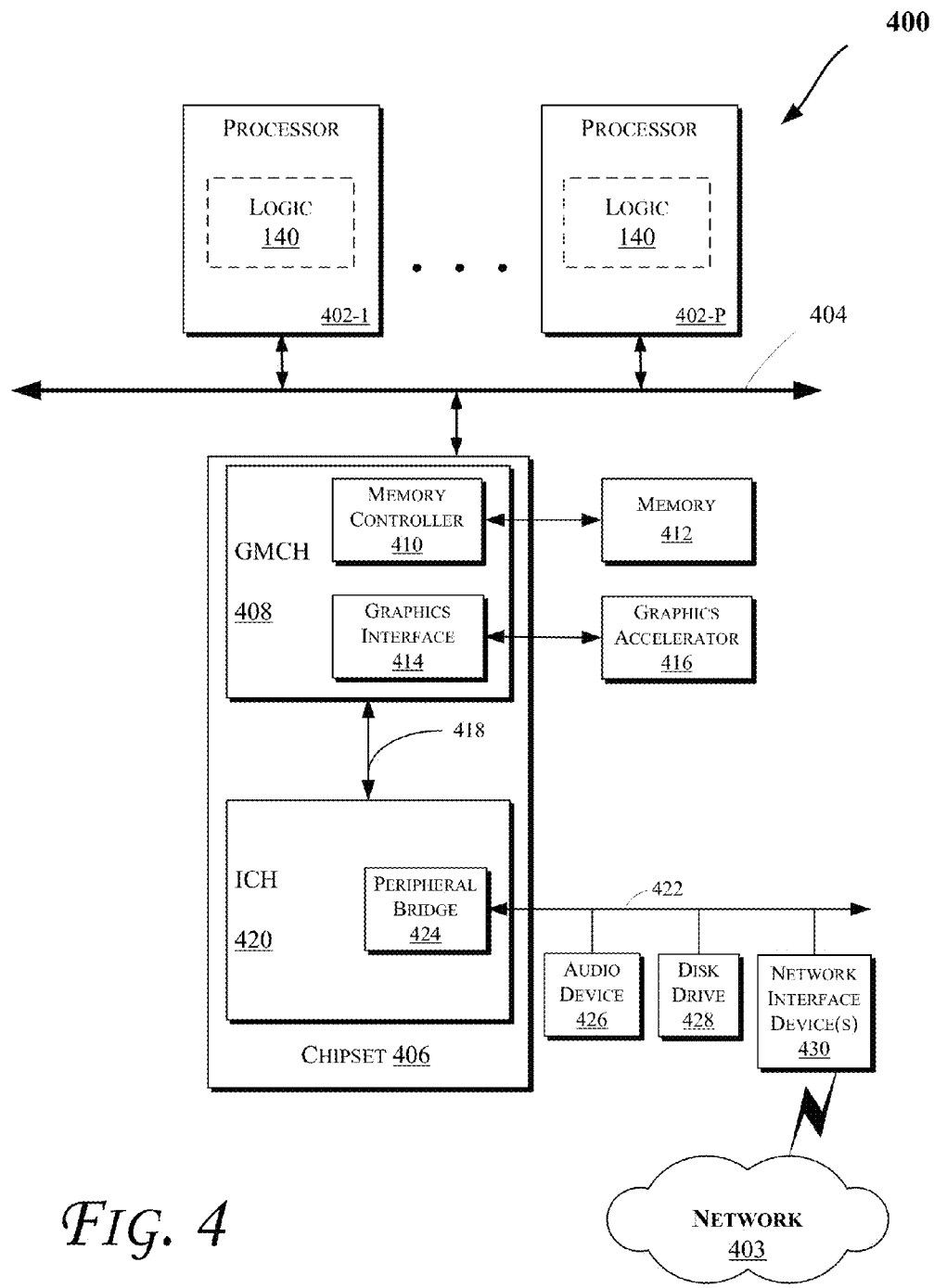

FIG. 4 illustrates a block diagram of a computing system 400 in accordance with an embodiment of the invention. The computing system 400 may include one or more central processing unit(s) (CPUs) or processors 402-1 through 402-P (which may be referred to herein as "processors 402" or "processor 402"). The processors 402 may communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. In some embodiments, one or more of the processors 402 may include one or more of the cores 106, logic 140, and sensor(s) 150, of FIG. 1. Also, the operations discussed with reference to FIGS. 1-6 may be performed by one or more components of the system 400. For example, a voltage regulator (such as VR 130 of FIG. 1) may regulate voltage supplied to one or more components of FIG. 4 at the direction of logic 140.

A chipset 406 may also communicate with the interconnection network 404. The chipset 406 may include a graphics and memory control hub (GMCH) 408. The GMCH 408 may include a memory controller 410 that communicates with a memory 412. The memory 412 may store data, including sequences of instructions that are executed by the processor 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMCH 408 may also include a graphics interface 414 that communicates with a graphics accelerator 416. In one embodiment of the invention, the graphics interface 414 may communicate with the graphics accelerator 416 via an accelerated graphics port (AGP). In an embodiment of the invention, a display (such as a flat panel display, a cathode ray tube (CRT), a projection screen, etc.) may communicate with the graphics interface 414 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the processor 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and one or more network interface device(s) 430 (which is in communication with the computer network 403). Other devices may communicate via the bus 422. Also, various components (such as the network interface device 430) may communicate with the GMCH 408 in some embodiments of the invention. In addition, the processor 402 and the GMCH 408 may be combined to form a single chip. Furthermore, the graphics accelerator 416 may be included within the GMCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration. For example, processors, memory, and/or input/output devices may be interconnected by a number of point-to-point interfaces.

Figure 5:
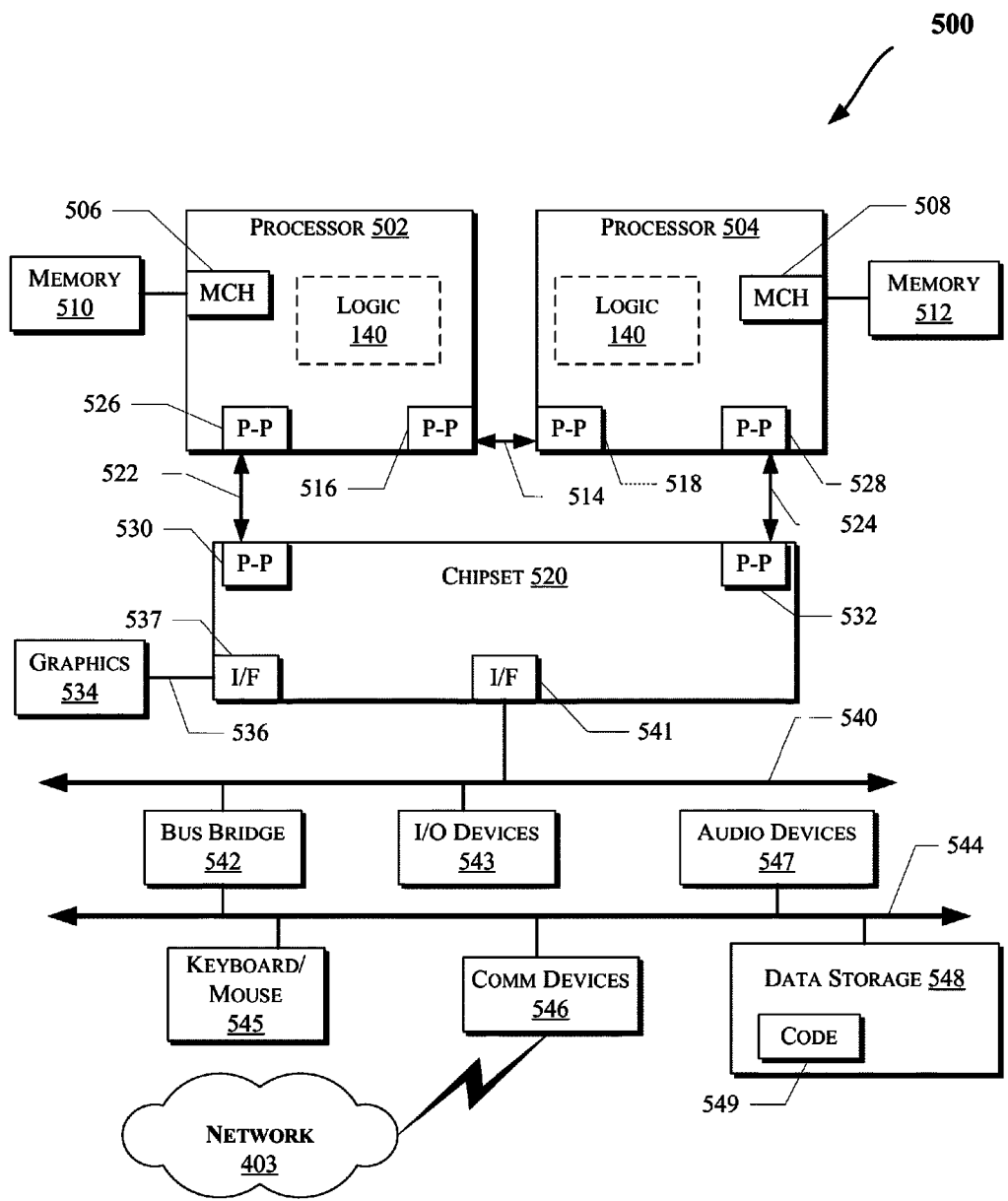

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500. For example, a voltage regulator (such as VR 130 of FIG. 1) may regulate voltage supplied to one or more components of FIG. 5.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4. Also, the processors 502 and 504 may include one or more of the cores 106, logic 140, and/or sensor(s) 150 of FIG. 1.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, one or more operations discussed with reference to FIGS. 1-6 may be performed by the processors 502 or 504 and/or other components of the system 500 such as those communicating via a bus 540. Other embodiments of the invention, however, may exist in other circuits, logic units, or devices within the system 500 of FIG. 5. Furthermore, some embodiments of the invention may be distributed throughout several circuits, logic units, or devices illustrated in FIG. 5.

Chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device, and/or a data storage device 548. The data storage device 548 may store code 549 that may be executed by the processors 502 and/or 504.

Figure 6:
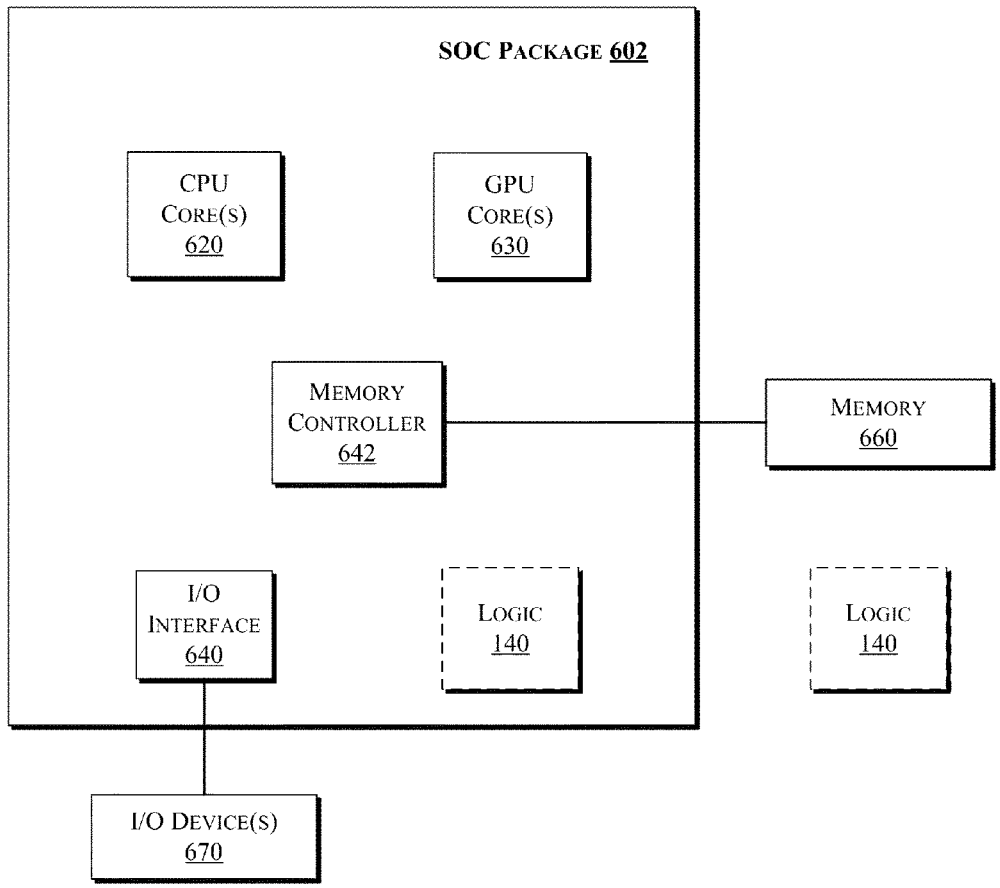

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like. Furthermore, SOC package 602 may include/integrate the logic 140 in an embodiment. Alternatively, the logic 140 may be provided outside of the SOC package 602 (i.e., as a discrete logic).

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    logic, at least a portion of which is in hardware, to cause modification to power consumption by one or more processor cores of a processor and one or more components coupled to the processor based on a total platform power consumption value,
    wherein a platform is to comprise the processor and the one or more components, wherein the total platform power consumption value is to be determined based on a signal from a first Analog to Digital Converter (ADC) and a second ADC, wherein the first ADC or second ADC is to generate the signal based on a power measurement by the first ADC or the second ADC, wherein the first ADC is to be coupled to a smart brick and the second ADC is to be coupled to a battery.

2. The apparatus of claim 1, wherein the one or more components are to comprise one or more of: chipset, platform control hub, memory controller, graphics logic, and memory.

3. The apparatus of claim 1, wherein the logic is to comprise one or more of: a power management unit, a power control unit, an embedded controller, and a node manager.

4. The apparatus of claim 1, wherein the total platform power consumption value is determined based on one or more of: a first value, corresponding to a power supply power consumption; a second value, corresponding to combined battery and power supply power consumption; and a third value corresponding to a battery power consumption.

5. The apparatus of claim 1, wherein the total platform power consumption value is determined based on one or more power consumption values that are set by one or more of: a basic input/output system, communication from a smart brick, and a battery.

6. The apparatus of claim 5, wherein the smart brick is to comprise a power supply that is capable to communicate its maximum output.

7. The apparatus of claim 5, wherein the battery is to comprise a smart battery that is capable to report its charge level.

8. The apparatus of claim 1, wherein the total platform power consumption value is determined based on a plurality of power consumption values corresponding to the processor and the one or more components of the platform.

9. The apparatus of claim 1, further comprising one or more sensors to detect variations in one or more of: temperature, operating frequency, operating voltage, and power consumption.

10. The apparatus of claim 1, wherein one or more of: the logic, the one or more processor cores of the processor, and a memory are on a single integrated circuit.

11. A method comprising:
    causing modification to power consumption by one or more processor cores of a processor and one or more components coupled to the processor based on a total platform power consumption value,
    wherein a platform comprises the processor and the one or more components, wherein the total platform power consumption value is determined based on a signal from a first Analog to Digital Converter (ADC) and a second ADC, wherein the first ADC or second ADC generates the signal based on a power measurement by the first ADC or the second ADC, wherein the first ADC is coupled to a smart brick and the second ADC is coupled to a battery.

12. The method of claim 11, further comprising determining the total platform power consumption value based on one or more of: a first value, corresponding to a power supply consumption; a second value, corresponding to combined battery and power supply power consumption; and a third value corresponding to a battery power consumption.

13. The method of claim 11, further comprising determining the total platform power consumption value based on one or more power consumption values that are set by one or more of: a basic input/output system, communication from a smart brick, and a battery.

14. A non-transitory computer-readable medium comprising one or more instructions that when executed on a processor configure the processor to perform one or more operations to:
    cause modification to power consumption by one or more processor cores of a processor and one or more components coupled to the processor based on a total platform power consumption value, wherein a platform comprises the processor and the one or more components, wherein the total platform power consumption value is determined based on a signal from a first Analog to Digital Converter (ADC) and a second ADC, wherein the first ADC or second ADC generates the signal based on a power measurement by the first ADC or the second ADC, wherein the first ADC is coupled to a smart brick and the second ADC is coupled to a battery.

15. The non-transitory computer-readable medium of claim 14, further comprising one or more instructions that when executed on the processor configure the processor to perform one or more operations to determine the total platform power consumption value based on one or more of: a first value, corresponding to a power supply consumption; a second value, corresponding to combined battery and power supply power consumption; and a third value corresponding to a battery power consumption.

16. The non-transitory computer-readable medium of claim 14, further comprising one or more instructions that when executed on the processor configure the processor to perform one or more operations to determine the total platform power consumption value based on one or more power consumption values that are set by one or more of: a basic input/output system, communication from a smart brick, and a battery.

17. The non-transitory computer-readable medium of claim 14, further comprising one or more instructions that when executed on the processor configure the processor to perform one or more operations to determine the total platform power consumption value based on a plurality of power consumption values corresponding to the processor and the one or more components of the platform.

18. The non-transitory computer-readable medium of claim 14, further comprising one or more instructions that when executed on the processor configure the processor to perform one or more operations to cause one or more sensors to detect variations in one or more of: temperature, operating frequency, operating voltage, and power consumption.

19. A system comprising:
a processor having a plurality of processor cores;
memory to store information corresponding power consumption of one or more components of the system;
logic, at least a portion of which is in hardware, to cause modification to power consumption by at least one of the plurality of processor cores of the processor and one or more components coupled to the processor based on a total platform power consumption value that is determined at least in part based on the stored information, wherein a platform is to comprise the processor and the one or more components, wherein the total platform power consumption value is to be determined based on a signal from a first Analog to Digital Converter (ADC) and a second ADC, wherein the first ADC or second ADC is to generate the signal based on a power measurement by the first ADC or the second ADC, wherein the first ADC is to be coupled to a smart brick and the second ADC is to be coupled to a battery.

20. The system of claim 19, wherein the one or more components are to comprise one or more of: chipset, platform control hub, memory controller, graphics logic, and the memory.

21. The system of claim 19, wherein the logic is to comprise one or more of: a power management unit, a power control unit, an embedded controller, and a node manager.

22. The system of claim 19, wherein the total platform power consumption value is determined based on a first value corresponding to a power supply power consumption.

23. The system of claim 22, wherein the total platform power consumption value is determined based on a second value corresponding to combined battery and power supply capabilities.

24. The system of claim 19, wherein the total platform power consumption value is determined based on one or more power consumption values that are set by one or more of: a basic input/output system, communication from a smart brick, and a battery.

25. The system of claim 24, wherein the smart brick is to comprise a power supply that is capable to communicate its maximum output.

26. The system of claim 24, wherein the battery is to comprise a smart battery that is capable to report its charge level.

27. The system of claim 19, wherein the total platform power consumption value is determined based on a plurality of power consumption values corresponding to the processor and the one or more components of the platform.

28. The system of claim 19, further comprising one or more sensors to detect variations in one or more of: temperature, operating frequency, operating voltage, and power consumption.

29. The system of claim 19, further comprising an audio device coupled to the memory.

30. The system of claim 19, wherein one or more of: the logic, the one or more processor cores of the processor, and a memory are on a single integrated circuit.

31. The apparatus of claim 1, wherein the total platform power consumption value is determined further based on a power consumption value that is set by a node manager.

32. The apparatus of claim 1, wherein at least one of the first ADC or the second ADC is to sense a voltage across a resistor to perform the power measurement, wherein the resistor is to be coupled between a power supply and the battery or the smart brick.

* * * * *